United States Patent
Senarath et al.

(10) Patent No.: US 8,068,876 B2
(45) Date of Patent: *Nov. 29, 2011

(54) BEAM WOBBLING FOR INCREASED DOWNLINK COVERAGE AND CAPACITY

(75) Inventors: Nimal Gamini Senarath, Nepean (CA); Yoon Chae Cheong, Kanata (CA); Shalini Periyalwar, Nepean (CA); Robert Matyas, Ottawa (CA)

(73) Assignee: Nortel Networks Limited, Mississauga, Ontario (CA)

( * ) Notice: Subject to any disclaimer, the term of this patent is extended or adjusted under 35 U.S.C. 154(b) by 1069 days.

This patent is subject to a terminal disclaimer.

(21) Appl. No.: 11/679,329

(22) Filed: Feb. 27, 2007

(65) Prior Publication Data

US 2007/0142045 A1    Jun. 21, 2007

Related U.S. Application Data

(63) Continuation of application No. 10/673,483, filed on Sep. 30, 2003, now Pat. No. 7,203,520.

(51) Int. Cl.
*H04M 1/00* (2006.01)

(52) U.S. Cl. ............ 455/562.1; 455/561; 455/450; 455/452.1

(58) Field of Classification Search .......... 455/562.1, 455/562.2, 560, 13.3, 19, 25, 63.4, 82, 83, 455/575.5, 575.7, 129, 193.1, 121
See application file for complete search history.

(56) References Cited

U.S. PATENT DOCUMENTS

| | | | |
|---|---|---|---|
| 5,448,753 A * | 9/1995 | Ahl et al. | 455/422.1 |
| 6,181,955 B1 * | 1/2001 | Dartois | 455/562.1 |
| 6,339,708 B1 | 1/2002 | Wang | |
| 6,400,955 B1 | 6/2002 | Kawabata et al. | |
| 6,542,478 B1 * | 4/2003 | Park | 370/308 |
| 2002/0090979 A1 | 7/2002 | Sydor | |
| 2004/0214582 A1 * | 10/2004 | Lan et al. | 455/452.2 |
| 2005/0068230 A1 | 3/2005 | Munoz et al. | |
| 2005/0143132 A1 | 6/2005 | Proctor, Jr. et al. | |

OTHER PUBLICATIONS

Shim et al., "Should the Smart Antenna Be A Tracking Beam Array Or Switching Beam Array?", IEEE Vehicular Technology Conference, 1998, pp. 494-498.

Zekavat et al., "Smart Antenna Arrays with Oscillating Beam Patterns: Characterization of Transmit Diversity in Semi-Elliptic Coverage", IEEE Transaction on Communications, vol. 50, No. 10, Oct. 2002, pp. 1549-1556.

* cited by examiner

*Primary Examiner* — Wayne Cai
(74) *Attorney, Agent, or Firm* — Louis B. Allard; Borden Ladner Gervais LLP

(57) ABSTRACT

A method and apparatus for reducing signal interference within a cellular radio system to increase both coverage and capacity. The method and apparatus include altering the direction of beams within cell sectors is among discrete angular positions according to a predetermined, cyclic pattern. The predetermined, cyclic pattern varies in a group of adjacent cell sectors such that inter-cell interference is significantly reduced or eliminated by rotating at a different cycle the beams in adjacent cells. This discrete, angular movement of beams provides for downlink transmissions to be timed in such a way (i.e., scheduled) such that transmission to a user will occur in accordance with the beam and time slot having the best carrier to interference (C/I) ratio for that user.

5 Claims, 5 Drawing Sheets

| Time Slots | | TS1 | TS2 | TS3 | TS4 |
|---|---|---|---|---|---|
| Rotation | Beam of Cell C1 | 0 | 0 | 20 | 20 |
| Angle | Beam of Cell C2 | 0 | 20 | 0 | 20 |

| Time Slots | | TS1 | TS2 | TS3 | TS4 |
|---|---|---|---|---|---|
| Rotation Angle | Beam of Cell C1 | 0 | 0 | 20 | 20 |
| | Beam of Cell C2 | 0 | 20 | 0 | 20 |

| Time Slots | TS0 | TS1 | TS2 | TS3 | TS4 | TS5 | TS6 | TS7 | TS8 | TS9 | TS10 | TS11 | TS12 | TS13 | TS14 | TS15 |
|---|---|---|---|---|---|---|---|---|---|---|---|---|---|---|---|---|
| Beams of Cell C1 | 0 | 0 | 20 | 30 | 0 | 10 | 10 | 30 | 10 | 10 | 20 | 20 | 30 | 30 | 30 | 30 |
| Beams of Cell C2 | 0 | 10 | 0 | 0 | 0 | 10 | 20 | 30 | 0 | 10 | 20 | 30 | 0 | 10 | 20 | 30 |

US 8,068,876 B2

BEAM WOBBLING FOR INCREASED DOWNLINK COVERAGE AND CAPACITY

CROSS-REFERENCE TO RELATED APPLICATIONS

This application is in continuation of U.S. patent application Ser. No. 10/673,483 filed Sep. 30, 2003.

BACKGROUND OF THE INVENTION

1. Field of the Invention

The present invention relates to the field of cellular radio system transmissions. More specifically, the present invention relates to overlapping cellular sectors within such cellular radio systems and ways to improve coverage and capacity in the downlink transmissions of such overlapping cellular sectors.

2. Description of the Prior Art

The rapid growth of telecommunications is perhaps no more acute than in the area of wireless communications. Mobile phones have become a standard personal appliance in nearly every country in the world. In some remote and rural places where the public switched telephone network (PSTN) infrastructure has been slow to advance, wireless communications have even surpassed the PSTN through the use of fixed wireless access technologies. Regardless of whether such wireless communications have been fixed or mobile, they have represented an unprecedented growth in cellular radio system traffic. Such ever-increasing traffic of more and more wireless users has created several problems for network operators including, but not limited to, significant interference among radio signals from the user equipment (UE) and the base stations (BS). Interference impacts upon many aspects of a cellular radio system performance, and it is therefore desirable to minimize such interference.

One basic solution to reduce signal interference between several UE and BS is simply to physically arrange each BS such that transmissions from one do not interfere with the other. Such a solution is not very practical for the reason that placing a BS in such a manner relative to another BS will almost inevitably lead to "dead zones" within which no adequate signal exists. From an interference-avoidance perspective, this is fine. However, any UE within the dead zone will suffer from reduced performance, handoff failures, or outright lack of a carrier signal. Accordingly, most cellular radio systems overlap cell sectors to increase the system coverage. Indeed, beams from the same BS may be designed to overlap each other. This can cause interference and reduce the system capacity significantly.

Other prior art solutions to improve coverage include: (a) soft-handoff (SHO); (b) dynamic interference avoidance; (c) fractional reuse; and (d) tiering. There is a large penalty in capacity because these schemes use additional resources from other cells. In addition, the schemes such as (a) and (b) are dependent on the availability of fast communication between base stations. SHO needs central processing of packets (i.e., frame synchronization for traffic and central MAC) that is difficult to implement under a futuristic distributed architecture. Moreover, per-user throughput distribution becomes better under these schemes, but may not be sufficient.

What is needed therefore is a solution to signal interference within a cellular radio system that is beneficial to both coverage and capacity and that can be implemented under a distributed architecture without requiring dynamic co-ordination among BSs.

SUMMARY OF THE INVENTION

The present invention provides a method and apparatus for reducing signal interference within a cellular radio system to increase both coverage and capacity. In accordance with the present invention, the direction of beams within cell sectors is altered among discrete angular positions according to a predetermined, cyclic pattern. The predetermined, cyclic pattern varies in a group of adjacent cell sectors such that a time-varying interference pattern is created in the geographical area. Two mobiles located in two different areas in the same sector would undergo different interference patterns depending on how they are located relative to the discrete movement of the interfering beams. This discrete, angular movement of beams is termed "beam wobbling" herein. Beam wobbling provides for downlink transmissions to be timed (i.e., scheduled) such that transmission to a UE will occur only when the beam placement is optimal for that UE. In other words, beam wobbling of the present invention enables downlink transmission to a UE to occur in accordance with the beam and time slot having the best carrier to interference (C/I) ratio for that UE subject to the competing scheduling requirements of the different mobiles.

The present invention seeks to significantly increase both coverage and capacity of a cellular system by substantially reducing interference. In particular, the coverage of wireless systems is very poor at the cell boundaries so that it requires multi-cell transmission techniques that impact capacity and needs extra level of co-ordination, i.e., more hardware and central controlling. In typical wireless systems, there is an unfair distribution of throughput among users that results in a higher cost of capacity for the services requiring equal throughput, e.g., voice and real time video. This invention provides a fairer distribution of available rates for the mobiles than other schemes making it suitable for equal throughput applications. However, when an unfair distribution is allowed, the artificially created C/I variation could better support such services by increasing the capacity significantly. Thus, the present invention provides a good multi-QoS solution. Moreover, the present invention could be implemented in a distributed architecture to increase coverage and capacity that is the preferred architecture for future generation wireless access systems.

In a first aspect of the present invention, there is included a method for reducing interference between adjacent cells of a cellular radio system, comprising: (a) in a cell of said cellular radio system, transmitting traffic along a downlink beam to a first user terminal during a first time slot; (b) rotating said downlink beam by a predetermined angle; (c) transmitting along said downlink beam to a further user terminal during a second time slot; and (d) repeating steps (a), (b), and (c) until the entire area of cell is covered.

In a second aspect of the present invention, there is included, a method of increasing downlink coverage and traffic capacity in a cellular communication system of the type where base stations are equipped with directional antennas that can assume one of I number of directions of transmissions where $I \geq 2$ comprising: at a first base station, successively directing a first radio beam in I number of directions $A(i)$ according to a first beam rotation scheme, where $i \in [2,I]$; and at a second base station adjacent to said first base station, successively directing a second radio beam in I number of directions $B(i)$ according to a second beam rotation scheme;

wherein said first beam rotation scheme and said second beam rotation scheme form J number of reception timeslots T(j) for user equipment located within said first radio beam and said second radio beam, each of said reception timeslots T(j) having different channel conditions, and said second base station allocating said reception timeslots T(j) according to quality of service requirements of each said user equipment.

In a third aspect of the present invention, there is included a method for controlling interference between first and second traffic carrying beams of adjacent cells of a cellular radio system, said method comprising: (a) rotating a first beam along a plurality of successive orientations according to a first rotation scheme; (b) rotating a second beam along a plurality of successive orientations according to a second rotation scheme; (c) identifying different timeslots with varying quality created by said first and second rotation schemes; and (d) selecting a reception timeslot from said different timeslots that corresponds to an optimal C/I ratio for user equipment residing within a location covered by both said first and second beams.

DETAILED DESCRIPTION OF THE INVENTION

Figure 1:
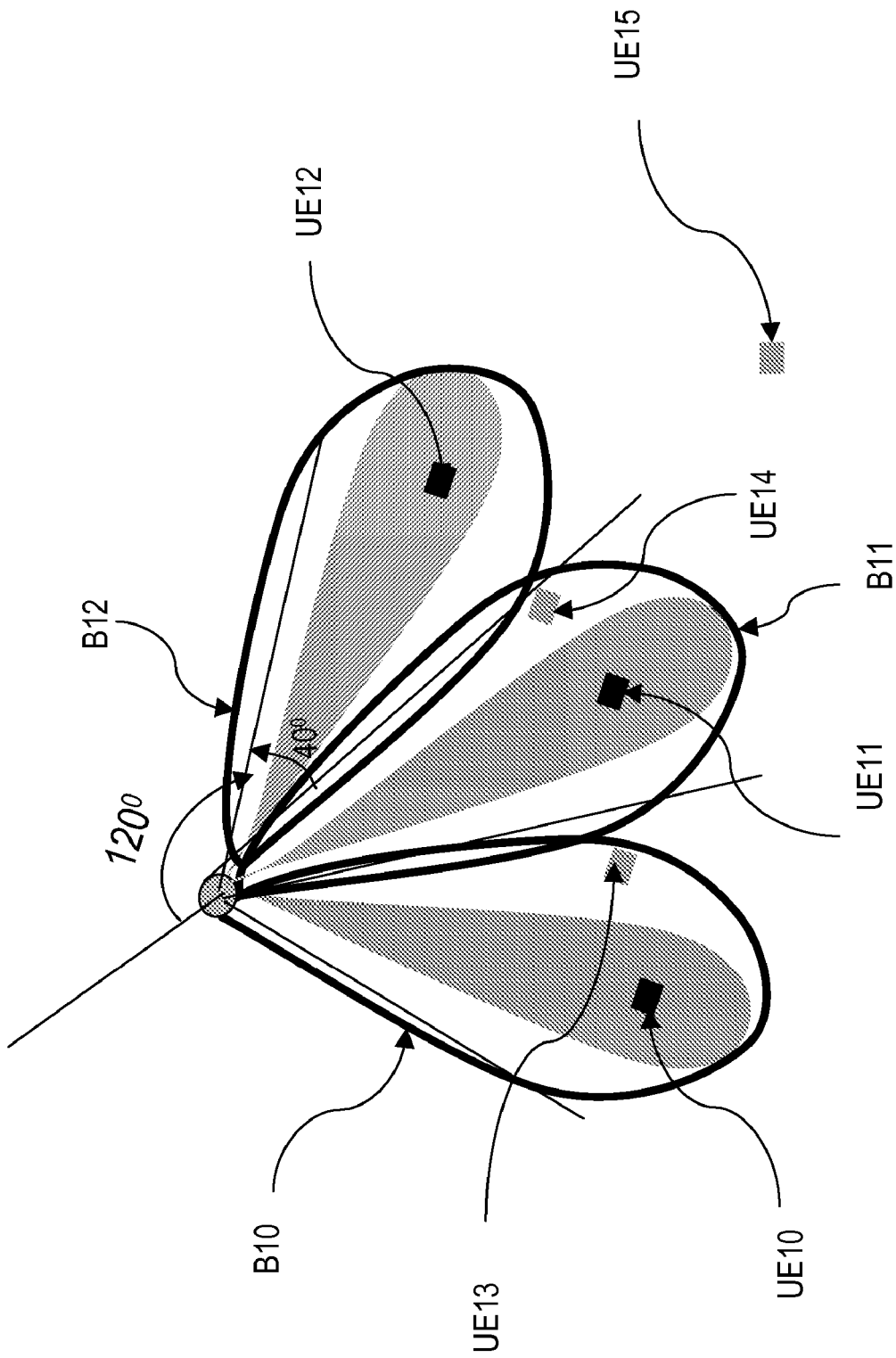
FIG. 1 is an illustration of three beams of an example directional (3 sector, 9-beam) antenna system for use with the present invention.

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

The present invention includes a beam rotation scheme for the downlink of a wireless system using multiple directional beams/antennas (e.g., tri-sector or 9-beam). Such rotations in the adjacent cells are done in different cycles so that the users in the overlapping areas observe reduced interference in some time slots for which the system can transmit to them. When a beam rotates, the mobiles in the edge of the beam coverage area will be placed in the middle of the beam thus improving the signal level. Similarly, the signal power from the interfering beams will also be improved or reduced. Since beams in the adjacent cells have different beam wobbling pattern, a mobile experiences all the combinations of beam rotation possibilities, one of which would give the best C/I for transmission. Overall, substantially all the users can improve their C/I value by selecting a time slot that avoids interference. This will improve both coverage and capacity significantly. The rotations can be improved by existing beam forming methods. While it should clearly be understood that many factors, such as beam pattern, number of sectors, modulation, ... etc. are possible, the results show significant capacity and coverage improvements with, for example, a half beam width rotation with a nine beam asymmetric antennae. With symmetric antennae and finer angles of rotation (e.g., quarter width) even better improvements are possible.

When multiple beams transmit in the downlink, the mobiles in the beam overlapping area get a higher level of interference from the adjacent beam. Therefore, if all the nine beams in the cell are rotated by a half beam width, the users originally located in the overlapping areas will be placed in the middle of the beams after rotation and their C/I will be improved significantly. For example, the edge to middle antenna gain difference in the nine-beam antenna system used for typical system is 8-10 dB. Those users can then use these time slots for transmission. Similarly, beams will overlap with the adjacent cell beams and the mobiles located at the edge of the cell will have high interference from the adjacent cell beams. When the adjacent beams are also rotated in a similar cyclic pattern, a group of users will have their interference reduced thus increasing their C/I value. So, those users can use the time slot during which the adjacent cell is in the rotated position.

Each UE could measure the pilot power of different beams or/and the C/I of different time slots and report the best time slots and the corresponding C/I of the beam with the strongest pilot. In order to avoid the impact of temporary fading the readings are averaged over several time slots. The scheduler in the BS is to use these C/I values and allocate times slots to the UEs according to service requirements and the C/I values.

In general, in all the illustrations of beam patterns herein are shown neglecting slow fading for simplicity. It should be understood that, in practice, these boundaries are not clear, although C/I based selection and scheduling and the associated gains are still valid.

FIG. 1 illustrates a directional 3-sector antenna of 120-degree coverage having beam widths of 40 degrees. The beams overlap at a portion of the coverage area. Several UE are shown in the beam paths at various locations. It should be readily understood that the UE in the area of beam overlap would experience interference to a greater degree than the UE located at the center of a beam. By rotating the beams by 20 degrees, the beams can be better directed to the UE situated in the overlapping areas. The present invention uses a deterministic rotation pattern to rotate the beams and transmit to the UE through the best beam position relative to that UE. The 20-degree rotation scheme with four patterns has been shown to produce significant coverage and capacity gains. When this is used with 10-degree rotations, larger gains are possible and when used for tri-sector systems where antenna gains change by a large amount within the coverage area, significantly larger gains are possible.

In such a pattern as illustrated in FIG. 1, the situation is fairly straightforward in that UE10, UE11, and UE12 are located in the center of beams B10, B11, and B12 respectively. UE13 is located at the overlap between beams B10 and B11 and UE14 is located at the overlap between beams B11 and B12. Rotation of the beams B10, B11, and B12 by a half of the beam width (i.e., 20 degrees) will result in UE13 being located in the center of beam B10 and UE14 being located in the center of UE14. Timing downlink transmissions to occur only when a UE is located in the center of the beam is the ideal. However, any location of the UE that yields relative improvements in C/I for that UE provides an important improvement according to the present invention. In other words, the location of a UE to which a downlink transmission is preferably effected may occur with more than one beam placement. Assuming that UE15 is served by a beam in an adjacent cell, the rotation of the beam B11 will maximize its interference. Thus, the transmission to UE15 should avoid the rotation position of the beam B11. In multi-cell systems, the simplicity of FIG. 1 is insufficient.

Figure 2:
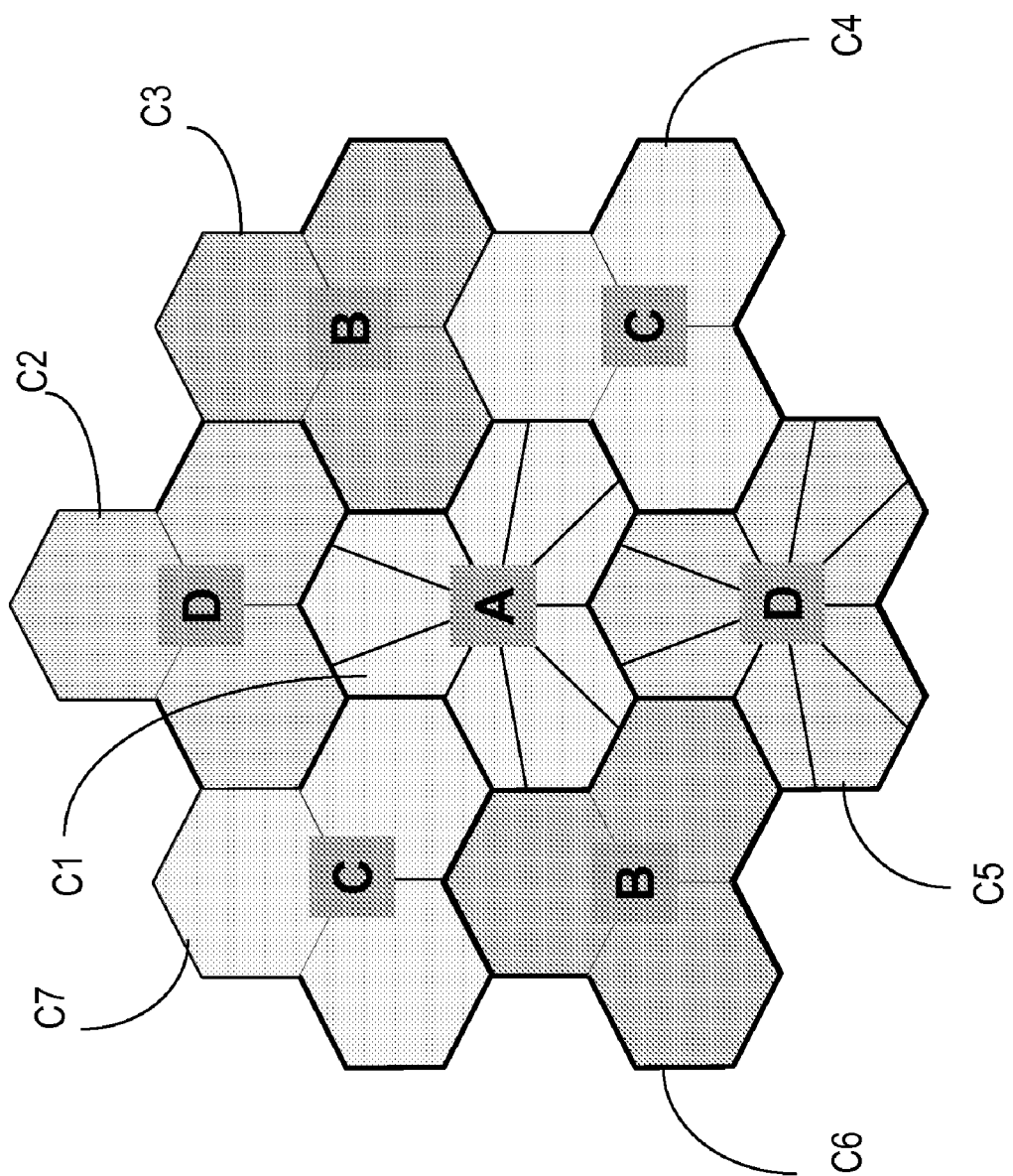
FIG. 2 is an illustration of a example multi-cell system in accordance with the present invention

FIG. 2 shows a typical multi-cell system with 7 cells C1-C7 that uses the beam wobbling in accordance with the present invention. In this example, the seven cells use a respective cell pattern A, B, C, or D. That is to say, the rotation pattern is re-used in such a manner as to avoid having the same pattern in adjacent cells. Seven cells and four patterns are shown for purposes of illustration and any other number of patterns and reuse scheme could be used. Patterns B, C, and D are duplicated as they do not overlap or otherwise interfere with one another due to their spacing across cell C1. In this way, inter-cell interference can be avoided by rotating the beams in the neighbouring cells with a different cycle. Moreover, the multi-cell pattern may be re-used in an adjacent system. Because a significant portion of interference comes only from adjacent cells, there is a large advantage in changing the rotation patterns of the adjacent cells.

Within a cell system as shown in FIG. 2 that embodies the invention, beams change direction among discrete angular positions according to a predetermined, cyclic pattern. In order for this to occur, all the adjacent beams should have orthogonal position changing patterns. This necessitates that the number of orthogonal patterns should be larger than the number of potential adjacent cells. For instance, if two rotation positions and four different changing patterns are used, there will be sixteen different beam position combinations within the system. Accordingly, each UE would experience a different C/I in each of these sixteen time slots. Advantageously, a UE can select the beam and time slot with the best C/I. When a large number of users are in the system, then time slots could be used in an efficient manner.

Figures 3, 4, 5:
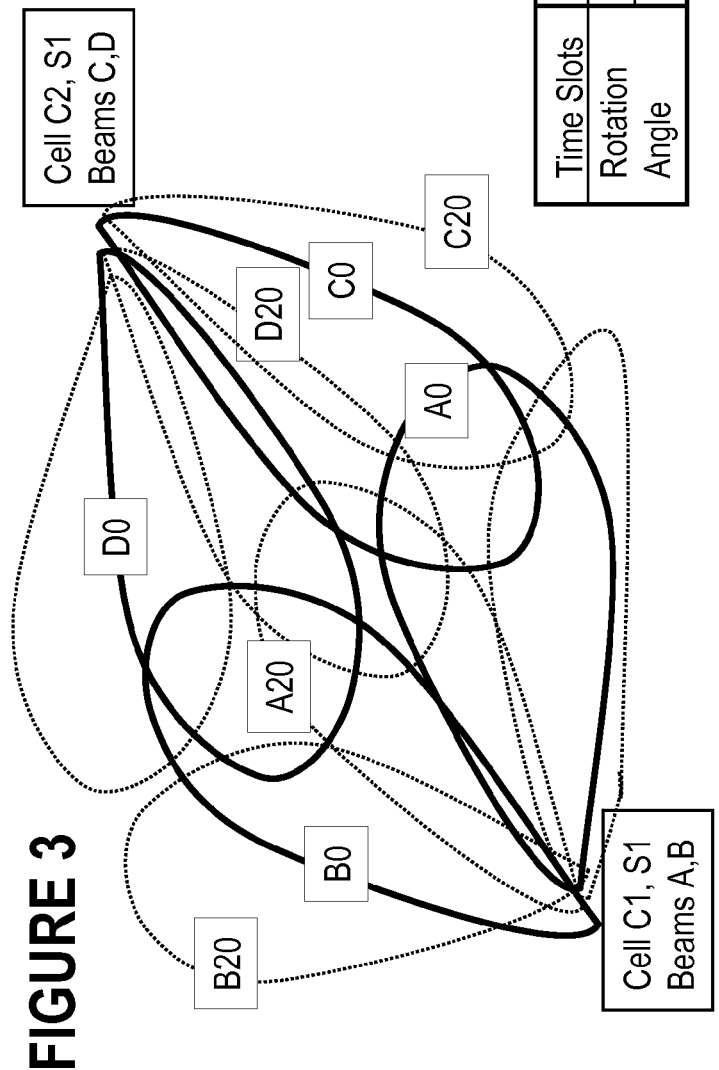
FIG. 3 is a representation of beam wobbling in accordance with the present invention.
FIG. 4 is a table representing four time slots the related rotation angle combinations for the representation in FIG. 3.
FIG. 5 is a table showing the combinations of rotation angles for a two-cell, four rotational position arrangement.

FIG. 3 shows an example representation of beam wobbling in accordance with the present invention. Here, it is assumed that there are nine beams per cell and three beams per sector, as also seen for cell C1 of FIG. 2. Beam wobbling in this example uses two rotation positions for each beam. At a beam width of 40 degrees, the beam width divided by two results in rotation angles of 0 degrees and 20 degrees being used. For simplification, FIG. 3 shows only beams A0 and B0 and their rotated positions A20 and B20 for cell C1 and beams C0 and D0 and their rotated positions C20 and D20 for the second cell C2. In this way, four time slots TS1, TS2, TS3, and TS4 may be obtained and the related rotation angle combinations are as shown in tabular format in FIG. 4.

In instances of two cells and four rotational positions, it would be necessary for sixteen time slots. FIG. 5 shows in tabular format the combinations of rotation angles for the two-cell, four rotational position arrangement.

In situations where multiple cells exist, the cells can be divided into four groups as discussed before. Each of the groups would have the same rotation pattern. That is to say, the rotation pattern would be re-used in such a manner as to avoid having the same pattern in adjacent cells. For two rotation steps, sixteen time slots would be needed. Similar to FIGS. 4 and 5, time slot 0 would be where all the groups are not rotated—i.e., a pattern {0, 0, 0}. Time slot 1 would be where only the fourth group was rotated—i.e., a pattern {0, 0, 0, 20}. Time slot 2 would be where only the third group was rotated—i.e., a pattern {0, 0, 20, 0}. This would continue until time slot 16 would be where all the groups are rotated—i.e., a pattern {20, 20, 20, 20}.

Figure 6:
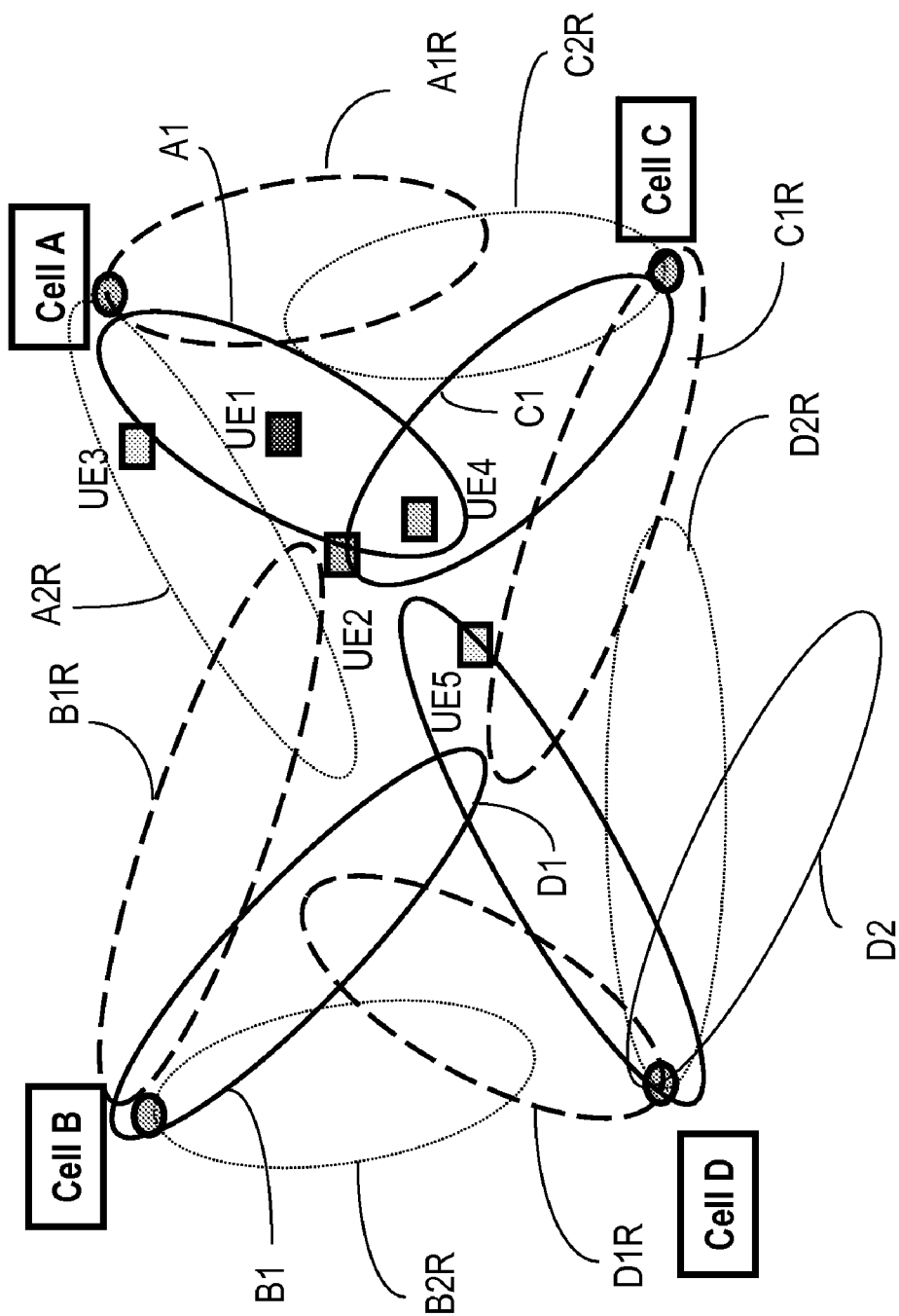
FIG. 6 is an illustration of a four-cell example of beam wobbling in accordance with the present invention.

FIG. 6 illustrates a four-cell example of beam wobbling in accordance with the present invention. Two rotations (N=2) are again assumed also in this example, and only the beans and/or rotations of relevance to this sector are shown. Thus, FIG. 6 illustrates one beam from each cell, denoted with A1, B1, C1 and respectively D1 in solid thick lines, representing the original position of the beams. The respective rotated variants A1R, B1R, C1R and D1R are shown in dotted lines. Also shown is a second beam D2 for cell D in a thinner, solid line, and the rotated variants A2R, B2R, C2R and respectively D2R of a second beam for all cells, in thinner dotted lines. UE1 through UE5 are located throughout the system of cells shown. It is clear from the FIG. 6 that only a certain beam position is optimal for any of UE1 through UE5. Further, due to the relative positional closeness of UE5 and UE4, for example, it is apparent that the interference becomes a significant factor for consideration. It is precisely in such instances where multiple beams and multiple users congregate when the value of the inventive beam wobbling is most readily apparent. By precisely timing downlink transmissions during a period when a given user is in the most suitable beam position, interference reduction can be maximized.

Situations of interference are clear from FIG. 6. For example, beams D1 and C1 do not overlap during downlink transmission such that interference is not likely an issue. However, beams A1 and C1 significantly overlap with one another as well as encompass three geographically dispersed users UE1, UE2, and UE4. Clearly, a downlink transmission to UE1 by beam A1 without any compensating factors (e.g., reduced transmit power) will interfere with a transmission to UE4 in beam C1. Further, UE2 will be caught between two equally poor positions should beams A1 and C1 simultaneously try to reach it. The present invention addresses at least the aforementioned problems such that the interfering beams act as if they were aware of the interfered UE and avoid transmissions during the allocated time slot. Advantageously, that time slot is not wasted because the beam will instead transmit to a different user in a different direction. This significantly improves overall system capacity. Beam wobbling solves this automatically without any feedback among base stations.

Figures 7, 8:
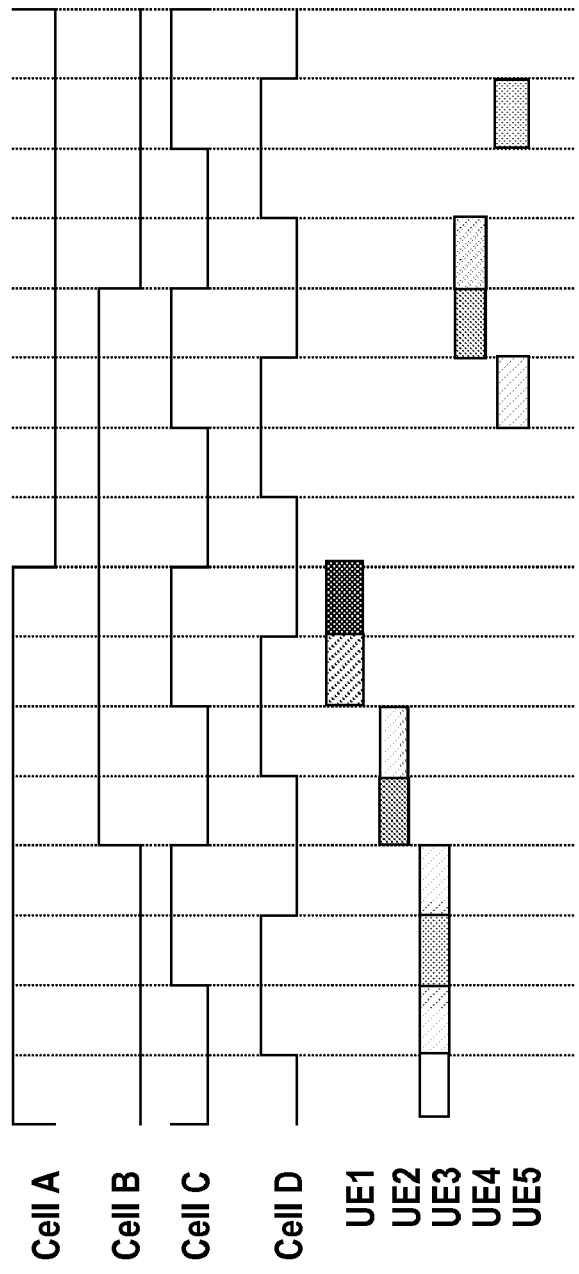
FIG. 7 is a table of a set of interfering positions that corresponds to FIG. 6.
FIG. 8 is a diagram based on the information within FIG. 7 that indicates the best and next best time slots.

In FIG. 7, there is shown in tabular format the interferences that may affect the users for the positions illustrated on FIG. 6. Differing users will of course have differing interferer combinations. It is evident that there are beam orientation combinations where the user can be reach with reduced interference, and that there are orientations where transmission to a certain user should be avoided. By providing a time slot for each combination, and enabling transmission to a certain user (more precisely location) when the respective combination of orientations is favourable, a large number of users (e.g., 400 per beam) could be accommodated across the time slots.

FIG. 8 is a diagram that indicates the rotation status for one of the beams for each cell of FIG. 7, where the original position is shown by a 'high' value and the rotated position by a 'low' value. FIG. 8 also shows the best time slot (solid) and the next best time slots (patterned) for the user placement illustrated in the example of FIG. 7. Best time slots are the time slots when all the interfering beams have a weak signal and the serving beam has its best rotation position. However, depending on the competing requirements of the incoming data to be transmitted to the UEs, some users may not be able to get the best time slot and could be allocated the next best time slots. As can be seen, for UE1 the best position is when all beams A1, B1 and C1 from cells A, B and C have the original (initial) orientation and the beam form from cell D is rotated (D1R). The next best timeslot is when cell D rotates its beam to the original orientation D1, but this will result in a slight increase in the interference. So the patterned time slot is the next best time slot for UE1.

The beam wobbling of the invention is further enhanced by the use of a scheduler. As suggested above, a user will have available several time slots with different C/I values. The scheduler can use these changes in C/I values to efficiently support multiple quality of service (QoS) requirements. For example, time slot allocations can be changed dynamically according to QoS requirements. This means that the physical layer will provides several options of transmissions to all the users. When physical layer provides such an option, the cost to the network is minimal because a higher layer could not do such allocations efficiently. Moreover, low C/I users can use better time slots to improve coverage and enable higher equal throughput capacity. The e beam wobbling according to the invention generates known fading with no C/I reporting impact. In other words, the present invention allows for Fade Selective Scheduling (FSS) schemes such as proportional-fair (PF) schemes, which can be used to increase capacity when equal throughput services are not required. It should be understood that the C/I increase occurs within the present invention by avoiding specific rotation positions of other beams.

In operation, the present invention provides significant coverage and capacity gains and even larger gains for the multi-QoS systems (e.g., voice/data). The present invention is suitable for future generation distributed architectures (automated interference avoidance without centralized control). While synchronization with the base station is still needed, there is no need for dynamic coordination.

Still further, the present invention can utilize purposely created 'fading' for even larger capacity gains possible. This is more likely with other schedulers (e.g., PF). This is evident from FIG. 4 where fading to reduce the reach of beam A1 to encompass only UE1 would significantly alter the system capacity in terms of cell A or cell C optimally transmitting to UE2 or UE4. Such fading aspect is considered well within the intended scope of the present invention. As well, it should be understood that there is flexibility for the scheduler to perform better QoS handling, i.e., physical layer multiple QoS solution.

The present invention may also be used together with power control within the slot period to provide an efficient voice and data solution. Further, wireless local area networks with spatially switched beams may benefit from the present inventive beam wobbling.

It should be understood that the preferred embodiments mentioned here are merely illustrative of the present invention. Numerous variations in design and use of the present invention may be contemplated in view of the following claims without straying from the intended scope and field of the invention herein disclosed.

What is claimed is:

1. A method for reducing interference between adjacent cells of a cellular radio system, comprising:
    (a) in a cell of said cellular radio system, transmitting traffic along a downlink beam to a first user terminal during a first time slot;
    (b) rotating said downlink beam by a predetermined angle;
    (c) transmitting along said downlink beam to a further user terminal during a second time slot; and
    (d) repeating steps (a), (b), and (c) until the entire area of the cell is covered;
    said predetermined angle being varied in accordance with a predetermined pattern, and said first and second timeslots being selected in accordance with carrier to interference (C/I) ratio and quality of service (QoS) requirements for each of the first user terminal and the further user terminal.

2. The method of claim 1, wherein said predetermined angle is a part of the width of said downlink beam.

3. The method of claim 1, wherein said steps (a) through (d) are performed in a cyclic manner.

4. A method for controlling interference between first and second traffic carrying beams of adjacent cells of a cellular radio system, said method comprising:
    (a) rotating said first traffic carrying beam along a plurality of successive orientations according to a first rotation scheme;
    (b) rotating said second traffic carrying beam along a plurality of successive orientations according to a second rotation scheme;
    (c) identifying different timeslots with varying carrier to interference (C/I) ratios created by said first and second rotation schemes; and
    (d) selecting a reception timeslot from said different timeslots that balances quality of service (QoS) considerations and carrier to interference (C/I) ratio for user equipment residing within a location covered by both said first and second traffic carrying beams.

5. The method of claim 4, wherein steps (c) and (d) include using orthogonal cyclic patterns for said first rotation scheme and said second rotation scheme.

* * * * *